United States Patent [19]
Leiber

[11] 3,888,328
[45] June 10, 1975

[54] ARRANGEMENT FOR COMPENSATING YAWING MOMENTS

[75] Inventor: Heinz Leiber, Leimen, Germany

[73] Assignee: Teldix GmbH, Heidelberg, Germany

[22] Filed: Mar. 15, 1973

[21] Appl. No.: 341,471

[30] Foreign Application Priority Data
Mar. 15, 1972  Germany.......................... 2212328

[52] U.S. Cl........... 180/79.2 R; 180/82 R; 180/103; 280/87 B; 303/21 AF
[51] Int. Cl.².......................................... B62D 5/06
[58] Field of Search.... 180/82, 103, 79.2 R, 79.2 D; 280/87 B, 89, 90; 303/21 AF, 21 F

[56] References Cited
UNITED STATES PATENTS

| | | | |
|---|---|---|---|
| 2,865,462 | 12/1958 | Milliken et al................. | 180/79.2 R |
| 3,288,232 | 11/1966 | Shepherd.......................... | 303/21 F |
| 3,567,290 | 3/1971 | Liggett et al. ................. | 303/21 AF |
| 3,667,813 | 6/1972 | Burckhardt et al............. | 303/21 EB |
| 3,719,246 | 3/1973 | Bott................................. | 180/103 |
| 3,734,228 | 5/1973 | Rivolier........................... | 180/82 R |

FOREIGN PATENTS OR APPLICATIONS 1,077,538  9/1960  Germany .......................... 280/96.2

*Primary Examiner*—David Schonberg
*Assistant Examiner*—John P. Silverstrim
*Attorney, Agent, or Firm*—Spencer & Kaye

[57] ABSTRACT

An arrangement for compensating for yawing moments occurring as a result of different braking forces acting on the steered wheels of a vehicle comprises means for obtaining values dependent on the braking forces acting on the individual steered wheels, comparison means for comparing the obtained values and producing a setting signal therefrom if such a difference is found and setting means operable in response to the setting signal and influencing the steering arrangements of the vehicle in a sense counter to the yawing moment occurring.

5 Claims, 4 Drawing Figures

ARRANGEMENT FOR COMPENSATING YAWING MOMENTS

BACKGROUND OF THE INVENTION

The invention relates to an arrangement for compensating, at least approximately, yawing moments which may occur, during braking, at the steered wheels of a vehicle, if different braking forces are applied to the wheel brakes.

In the case of vehicles with conventional wheel suspension, a yawing moment occurs as is well known, that is to say a moment about the vertical axis or plane of the vehicle, if the braking forces occurring at the steered wheels are of different values, whether this is by reason of a different grip of the associated brakes, or on account of different frictional coefficients which are effective between wheel and road surface.

It is known (German Pat. No. 1,077,538) to eliminate these yawing moments due to the steered wheel by a suspension of the steered wheels, in which the axis of rotation of the wheels cuts the roadway outside the base of the vehicle. An additional counter yawing moment, which compensates for the above described moment arises on braking as a result of this suspension.

In many vehicles, particularly in commercial vehicles, however, the realization of this wheel suspension involves considerable, and to some extent, insuperable difficulties, particularly if the vehicles are equipped with drum brakes, since sufficient mounting room is not available.

SUMMARY OF THE INVENTION

It is an object of the invention to create an arrangement for the steered wheels of a vehicle which has the same effect as the described wheel suspension, but which can also be realized where a realization of the known solution proves to be impossible.

According to the invention, there is provided an arrangement for compensating for yawing moments occurring as a result of different braking forces acting on the steered wheels of a vehicle comprising first means for producing values dependent on the braking forces acting on each steered wheel of the vehicle, second means for comparing said values provided by said first means and producing a setting signal therefrom when a difference in the braking forces is found, and a setting element to which said setting signal is applied and which is connected to the steering arrangements of the vehicle to influence the steering of the vehicle in a sense counter to the yawing moment occurring as a result of said difference.

BRIEF DESCRIPTION OF THE DRAWINGS

The invention will now be described in greater detail, by way of example, with reference to the drawings, in which.

DESCRIPTION OF THE PREFERED EMBODIMENT

Figure 1:
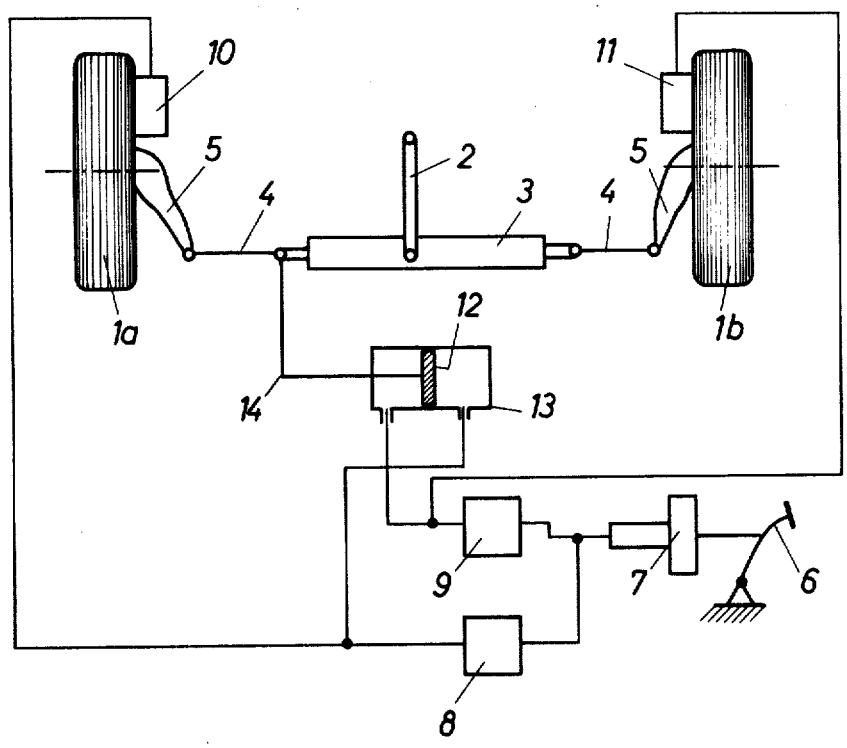
FIG. 1 shows a first embodiment of the invention illustrated in principle.

Basically, the invention provides means for obtaining a quantity dependent upon the braking forces at the individual wheels, a comparator which produces a setting signal by comparison of the measured quantities, and a setting element, influencing the steering of the vehicle, connected to the steering, to which the setting signal is fed and which influences the steering in dependence thereof in the sense of producing a counter moment.

As in the case of the known solution, then, compensation is also effected in the case of the invention by producing a counter moment. The invention can be realized in different ways. Thus the quantities dependent upon the braking forces can be obtained in different ways, for example, by producing a quantity dependent upon the rotary deceleration or the slip of the wheel. The wheel in this case can have an anti-locking controller or can operate without an anti-locking controller. In the case of vehicles with separately operating anti-locking controllers at the steered wheels, the mean braking pressure, existing in each case at the brakes, is a measure of the braking forces at the wheels and preferably this braking pressure is used. In this case quantities which are dependent upon the two braking pressures, e.g. voltages can be produced and compared, but in accordance with a further form of the invention, the braking pressures can also act on the two sides of a movable wall device (piston or diaphragm). Here the braking controllers provide the means for obtaining the quantities dependent upon the braking force, which quantities are fed unconverted to the comparator element. A préssure comparator element is, however, also applicable if no automatic anti-locking controller is provided. However, both wheel brakes of the steered wheels are in different braking circuits. Also conceivable are brake circuit distributions with, for example, each braking circuit including wheels lying diagonally, one front wheel in one circuit and the other wheels in the other circuit, or one front wheel and both rear wheels in each circuit (in this last case both circuits act on the rear wheels). In the case of failure of one circuit, steering is affected. In the case of a braking circuit distribution with braking controllers present at the steered wheels, failure of the braking circuit and braking at different $\mu$ is taken into account by applications of the invention.

In addition to the pulling to one side of the steered wheels, occurring by virtue of the differing braking forces, which pulling produces a yawing moment compensated for by the counter moment, a compensated yawing moment also acts on the vehicle body, if the wheels on the two sides of the vehicle are acted on by different braking forces. In accordance with a further embodiment, such an arrangement is used for compensation that the yawing moment occurring as a result of the braking of the steered wheels is over-compensated for so that a certain amount of compensation moment is available for compensating the moment applied to the vehicle body.

According to a further embodiment, it is also favorable to determine the different braking forces acting at the non-steered wheels and to have a quantity act on the setting of the steering in dependence on the difference of the braking forces of these non-steered wheels. This can be achieved by a superimposition of this quantity on the quantity obtained for the steered wheels. When using a pressure differential measuring device as above described, a corresponding second pressure measuring device can be provided for the other wheels. The value of the common deflection of the pistons of both devices will depend on the two pressure differences.

For example, a direct current motor can be used as the setting element, which motor carries out an adjustment of the steering in dependence on the setting signal obtained by the comparator element. When using the movable wall device for pressure comparison, the displacement of the wall can also be used directly for setting the steering (if necessary through a transmission system).

If a braking system is used in which the pressure is not produced by the driver himself, in which instead a hydraulic pressure source is provided, the pressure from which has to be made to act variably but controllably at the brakes for actuating the brakes, it is sensible to make the pressure action on the steering ineffective if a series reduction in the pressure of the pressure source occurs (that is to say, in the case of failure or impending failure of the pressure source), so that the pressure still present (if necessary, produced by an emergency piston) does not act on the steering.

Referring to the drawings, the principle of an embodiment of the invention is shown in FIG. 1. Here the two steerable wheels of a vehicle are given the references 1a and 1b. The steering is effected by means of the steering column 2, which is only shown in part. This steering column 2 is connected to an arrangement 3, containing a rack movable to left and right, which by means of rods 4, pivotably connected thereto, and levers 5 engaging the wheel mounting, steers the vehicle. The braking of these wheels is effected by means of a brake pedal 6 which actuates a brake master cylinder 7. Blocks 8 and 9 represent separately operating automatic anti-locking controllers of known construction, each associated with one of the two wheel brakes 10 and 11 respectively.

When braking on road or ground surfaces having different frictional coefficients with respect to the wheels, one of the wheels may show a tendency to lock, whereupon its braking pressure is reduced to such an extent that a tendency to lock is no longer signalled by sensors (not shown) associated with the wheels. The braking pressure difference existing at the individual wheel brakes is to a certain extent an approximate measure of the difference of the brake forces. This braking pressure difference causes a displacement of a piston 12 whose cylinder 13 is divided, by the piston, into two chambers in which the different brake pressures exist. This displacement of the piston 12 is trnsmitted to the steering linkage by means of the mechanical connection 14, which can also include a transmission arrangement, whereby an alteration of the setting of the steering occurs. As a result of this alteration, a counter moment occurs, which counteracts the yawing moment resulting from the different braking forces. The brake pressure for wheel 1a must, in an appropriately constructed arrangement, be present in the right hand chamber of the cylinder 13 and the brake pressure of the brake 11 must be present in the left hand chamber.

Figure 2:
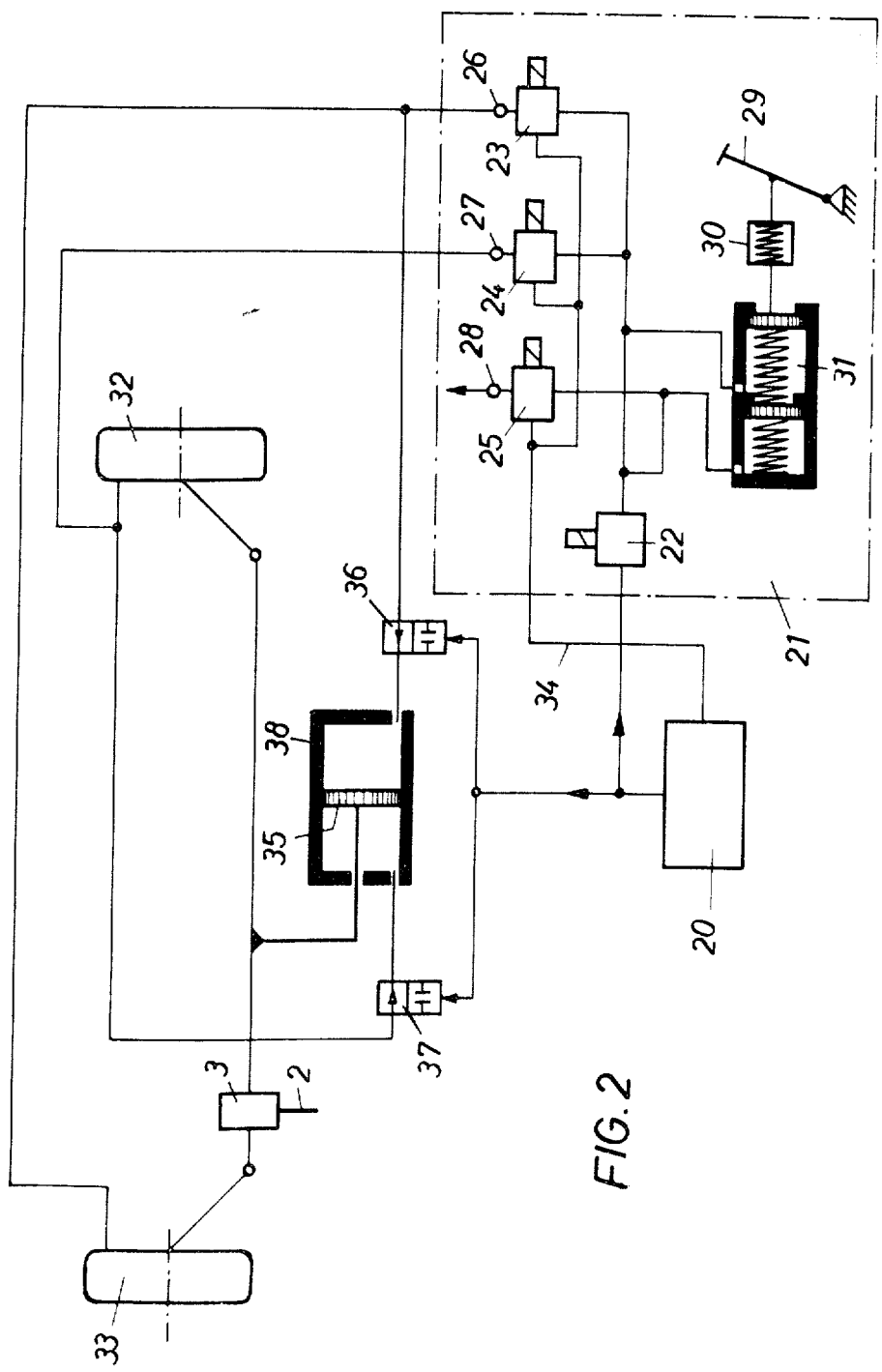
FIG. 2 shows a second embodiment in which a separate hydraulic pressure source is used.

In FIG. 2, a braking arrangement is shown comprising a hydraulic pressure source (e.g. a pump and store) shown as a block 20 and a brake control device is shown at 21. The device 21 includes a valve 22, control valves 23 to 25, pressure sensors 26 to 28, a brake pedal 29, a pedal pressure sensor 30 and an emergency piston arrangement 31. The electronic equipment belonging thereto is not shown, since its particular construction is of relatively little importance.

If the brake pedal 29 is depressed, valve 22 opens first and allows the brake fluid pressure to increase at the brakes of the wheels 32 and 33 and at the brakes of the rear wheels (not shown) to which the output of the valve 25 leads, by means of the valves 23 to 25 which are open. A voltage corresponding to the force applied by the driver to the pedal 29 is produced by the pedal pressure sensor 30. This voltage is compared, in comparators or compensators with the voltages of the pressure sensors 26 to 28, which produce voltages dependent on the brake fluid pressure. If the voltage of one pressure sensor exceeds the voltage of the pedal pressure sensor 30, the required braking pressure at the associated brake is exceeded and the valves 23 to 25 are changed over. They now allow the braking pressure to fall, by letting brake fluid flow back to the pressure source 20 by means of a return line 34. If the brake fluid pressure again falls below the required pressure level, an increase in pressure is again permitted by changing back the valve or valves. If the pressure source fails, braking can be effected by means of the emergency piston arrangement 31, which can be actuated by means of the brake pedal 29.

The valves 23 to 25 are also controlled by an evaluation circuit (not shown) for preventing wheel locking. The pressure existing after the valves 23 and 24 is a measure of the braking forces at the wheels 32 and 33. The pressure difference can therefore also be used here to control the piston 35 which acts on the steering linkage.

Further additional valves 36 and 37 are provided in the feed lines to the chambers of the cylinder 38, and these valves are acted upon by the pressure of the pressure source 20. With sufficient pressure present in the pressure source, the valves remain in the "open" position. If, on the other hand, the pressure of the pressure source 20 drops to a predetermined low value and braking has to be effected by the emergency piston arrangement, the valves 36 and 37 close and the pressure produced by the emergency piston does not act on the piston 35, thus conserving the emergency pressure.

The brake control device 21 is an example by which it can be demonstrated that the principle of the invention can also be used where the brake pressure is produced by a separate pressure source, that is to say with a so-called "full-power" system and that additional act-off valves can be incorporated into such braking systems.

Figure 3:
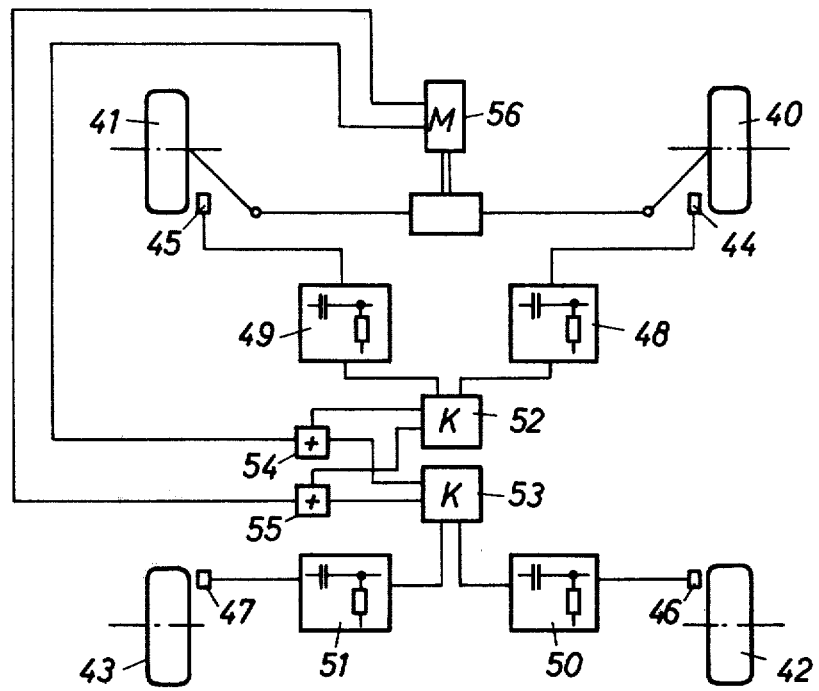
FIG. 3 shows a third embodiment of the invention.

FIG. 3 shows schematically an embodiment in which the effects of all the wheels act on the setting of the steering. In this case, an electric motor is used as a drive for the control and its operation is controlled by means of a comparison of the deceleration of the wheels. The four wheels of the vehicle are given the reference numerals 40 to 43. The wheel brakes and the feed lines thereto are not shown. Wheel speed sensors 44 to 47 are shown at the wheels 40 to 43, the voltages of which wheel speed sensors are converted in elements 48 to 51 into voltages corresponding to the wheel decelerations. The two deceleration values of the wheels of one axle are compared in the elements 52 and 53 and control signals are produced on the appearance of a certain deviation between the values, which signals are superimposed in the elements 54 and 55 to control the electric motor 56 in one or the other sense. The motor 56 sets the steering e.g. by means of a rack and pinion arrangement, in the sense which produces a moment counter to the yawing moment occurring on the vehicle. According to the motor type, a coupling can be necessary between motor and steering linkage, which coupling connects the motor to the steering as required. By the superimposition of the control signals obtained in respect of both axles, the influence of the controlled variables produced for the steered wheels can be balanced out.

Instead of the comparison of the deceleration, a comparison of the speeds of the wheels on one axle can also be carried out, (e.g. in the elements 52 and 53, the elements 48 to 51 are then superfluous can be dispensed with). From this speed comparison a controlled variable can be derived which can be used for producing the counter moment required.

Figure 4:
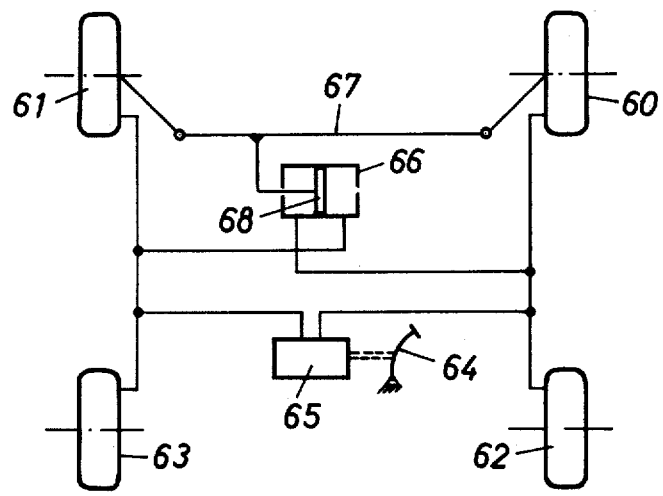
FIG. 4 shows a fourth embodiment in which the yawing moment is avoided particularly when a brake circuit fails.

In the embodiment of FIG. 4, the four wheels of one vehicle are given the reference numerals 60 to 63. The brakes of these wheels are connected to a dual circuit brake system which is actuated by a brake pedal 64 through a brake master cylinder 65. A front wheel and a rear wheel is included in each braking circuit. The brake pressures of the braking circuits are fed to the chambers of the cylinders 66. Since these pressures are usually the same, no variation of the action of the steering linkage 67 results. However, if one brake circuit fails, a large yawing moment would occur in the case of the brake circuit distribution shown. The piston, connected to the steerage linkage 67 is caused to act to counter the yawing moment, so that the yawing moment is eliminated at least to a large extent.

As already mentioned, the solution in accordance with the invention is particularly conceived for commercial vehicles, especially for commercial vehicles which are equipped with pump and store type braking systems (of the compressed air or hydraulically driven types), but it will be appreciated that application to other types of vehicles is possible.

It will be understood that the above description of the present invention is susceptible to various modification changes and adaptations.

What I claim is:

1. An arrangement for compensating for yawing moments generated as a result of different braking forces acting on the steered wheels of a vehicle steered by a steering mechanism, comprising in combination:
    a. an antilock device connected to the brake of each steered wheel for separately varying the braking pressure in the associated wheel as a function of the locking tendency thereof;
    b. signal generating means connected to the brakes of said steered wheels for obtaining separate signals dependent upon the braking pressures in the brakes of said steered wheels;
    c. comparator means connected to said signal generating means for comparing the signals characterizing the braking pressures in the brakes of the different steered wheels and for emitting a setting signal as a function of the difference in said braking pressures; and
    d. a setting mechanism connected to said comparator means for receiving said setting signal; said setting mechanism being further connected to said steering mechanism for applying a moment thereto as a function of said setting signal for countering the effect of the yawing moment generated by said difference in said braking pressures.

2. An arrangement as defined in claim 1 wherein said comparator means comprises a chamber divided into two parts by a movable wall, said signal generating means comprises means for feeding said separate signals to one and the other of said two parts to act oppositely on said movable wall and said setting mechanism comprises means for transmitting movement of said movable wall to the steering mechanism of the vehicle; the extent of displacement of said movable wall constituting the magnitude of said setting signal.

3. An arrangement as defined in claim 2, wherein said means for transmitting movement comprises a mechanical linkage directly transmitting said movement of said movable wall to a linkage of said steering mechanism of the vehicle.

4. An arrangement as defined in claim 2 and for use in a vehicle having brakes operable by an independent pressure source controlled by a brake pedal, further comprising valve means for preventing feeding of said brake fluid pressures to said chamber parts if the pressure of said pressure source falls below a predetermined value.

5. An arrangement as defined in claim 1, wherein said signal generating means, said comparator means and said setting mechanism comprise constructions adapted to provide over compensation of said yawing moment.

* * * * *